United States Patent [19]

Fortin et al.

[11] Patent Number: 5,041,343
[45] Date of Patent: * Aug. 20, 1991

[54] PROCESS FOR IMPROVING THE CORROSION RESISTANCE OF BRAZING SHEET

[75] Inventors: Paul E. Fortin; Pierre H. Marois; Dewi G. S. Evans, all of Kingston, Canada

[73] Assignee: Alcan International Limited, Montreal, Canada

[*] Notice: The portion of the term of this patent subsequent to Aug. 6, 2008 has been disclaimed.

[21] Appl. No.: 301,653

[22] Filed: Jan. 25, 1989

[30] Foreign Application Priority Data

Jan. 29, 1988 [CA] Canada ................................. 557720

[51] Int. Cl.$^5$ .......................... B32B 15/10; C22F 1/04
[52] U.S. Cl. ...................................... 428/654; 148/2; 148/11.5 A; 148/11.5 Q; 148/127; 428/610
[58] Field of Search ................. 148/2, 11.5 A, 11.5 Q, 148/127; 428/610, 654

[56] References Cited

U.S. PATENT DOCUMENTS

| | | | |
|---|---|---|---|
| 2,821,014 | 1/1958 | Miller | 428/654 |
| 3,788,824 | 1/1974 | Singleton, Jr. et al. | 428/654 |
| 3,994,695 | 11/1976 | Setzer et al. | 428/654 |
| 4,039,298 | 8/1977 | Anthony et al. | 428/558 |
| 4,039,782 | 6/1978 | Anthony et al. | 428/654 |
| 4,172,548 | 10/1979 | Nakamura | 228/183 |
| 4,339,510 | 7/1982 | Kaifu et al. | 428/654 |
| 4,586,964 | 5/1986 | Finnegan et al. | 148/11.5 A |
| 4,649,087 | 3/1987 | Scott et al. | 428/654 |
| 4,828,936 | 5/1989 | Toma et al. | 428/654 |

FOREIGN PATENT DOCUMENTS 0241125 10/1987 European Pat. Off. .
211056 10/1985 Japan ................................. 148/127

Primary Examiner—R. Dean
Assistant Examiner—Robert R. Koehler
Attorney, Agent, or Firm—Cooper & Dunham

[57] ABSTRACT

A process is described for producing a corrosion resistant aluminum composite sheet product for use in brazing. The process steps comprise:

(a) casting an aluminum-base core material containing no more than 0.4% iron, no more than 0.15% silicon, from about 0.1% to about 0.6% copper and from about 0.7% to about 1.5% manganese, (b) cladding the as-cast core material with an aluminum-base brazing alloy, with hot rolling to form a sheet product, and (c) directly cold rolling the sheet product to final gauge. When this product is subjected to a brazing heat cycle, a band of dense precipitate is formed in the core alloy immediately adjacent the cladding which protects the core against corrosion.

14 Claims, 1 Drawing Sheet

PROCESS FOR IMPROVING THE CORROSION RESISTANCE OF BRAZING SHEET

BACKGROUND OF THE INVENTION

This invention relates to brazed aluminum, and particularly to a process for improving the corrosion resistance of brazed aluminum products, as well as composite sheet materials for use in making such brazed products.

Aluminum has long been desired as a material of construction because of its resistance to corrosion. With the development of non-corrosive flux brazing and vacuum brazing techniques for joining aluminum parts, aluminum is now widely used in the manufacture of heat exchangers, particularly in the form of automotive radiators and evaporators for air conditioning units. Non-corrosive flux brazing and vacuum brazing have an important advantage over the traditional flux brazing in that they avoid the need for expensive cleaning operations normally associated with flux brazing.

Corrosion resistance is a concern common to components produced by all brazing methods. For example, road salt and moisture are sufficiently corrosive to often cause perforation of automotive radiators. In many cases corrosion problems originate in the brazing technique itself, e.g., through penetration of an element of the brazing alloy (particularly silicon) into the core alloy. This may occur along the grain boundaries of the core alloy during the brazing heat cycle and results in a sensitization of the core to intergranular attack.

It has been known for many years that corrosion problems in brazing can be alleviated to some extent by adding an interlayer between the structural member portion or core and the brazing layer. Such an interlayer is described, for instance, in Miller U.S. Pat. No. 2,821,014. The problem of corrosion in vacuum brazing is particularly considered in Singleton et al U.S. Pat. No. 3,788,824, where iron is added to either the core alloy or the cladding alloy to provide corrosion resistance and sag resistance. Various other patents such as U.S. Pat. Nos. 4,039,298, 4,093,782, 3,994,695, 4,339,510 and 4,649,087 describe various combinations of alloying components particularly for the core alloy which are claimed to provide benefit in intergranular corrosion resistance.

In Nakamura, U.S. Pat. No. 4,172,548, a procedure is described for controlling corrosion following vacuum brazing by controlling the grain size of the brazing sheet to at least 60 microns in diameter, this being achieved by a controlled cold work followed by a full anneal.

Finnegan et al, U.S. Pat. No. 4,586,964 also considers the problem of corrosion in a vacuum brazed produc and suggests a technique in which an interanneal is provided before a controlled cold work. This controlled cold work is maintained within a certain range of reduction.

With all of the above efforts to control corrosion in brazed products, corrosion still remains as a problem.

SUMMARY OF THE INVENTION

It has now been discovered that corrosion, such as intergranular corrosion, in composites that have been brazed with or without flux is best controlled by a combination of the particular composition of the core material and the technique used for preparing the brazing sheet.

Thus, the core material used in the composite sheet product of this invention is an aluminum-based alloy containing no more than 0.4% iron, no more than 0.15% silicon, from about 0.1% to about 0.6% copper and from about 0.7% to about 1.5% manganese. Optionally, the core alloy may also contain no more than 0.8% magnesium and/or from about 0.05% to about 0.25% zirconium.

The above core alloy is clad with aluminum-based brazing alloy, with hot rolling to form a sheet product. This sheet product is then, without any interanneal, cold rolled to final gauge. After the cold rolling, the composite sheet is usually annealed, either partially or fully.

When the composite sheet of this invention is submitted to a brazing heat cycle, it has been discovered that, in the core alloy, immediately adjacent the brazing alloy cladding, there is formed a band of dense precipitate which appears to play a major role in improving the corrosion resistance of the brazed sheet. This band of dense precipitate corrodes preferentially to the core and will substantially corrode away before the core alloy is attacked. Thus, it protects the brazement from perforation. Any brazing process may be used, e.g. vacuum brazing, Nocolok ®Neitz or dip brazing.

It is known that in the as-cast core ingot, most of the manganese is in super-saturated solid solution. It was observed that before brazing, core alloys of this invention exhibit a fine, uniformly distributed, dense precipitate of Mn-containing particles. For brazing, the metal is brought up to about 600° C. and in most of the core, the smallest precipitate particles become unstable and revert to solid solution, except in a band subjacent to the brazing alloy cladding. Analysis by x-rays has shown that because silicon diffused from the cladding into the core during the brazing cycle forming a layer with high silicon content, the manganese solid solubility was reduced markedly and this not only minimized re-dissolution of the manganese-containing particles but promoted further precipitation of manganese still in solid solution. The particles themselves in the band contain silicon but those away from the band contain little or no silicon.

Before brazing, the above particles (which are often called dispersoids) are fine and numerous, having sizes in the order of 0.03 to 0.1 μm. During brazing, in the core outside the band the smaller particles dissolve and some manganese precipitates on the surviving coarser particles, increasing their size to between 0.1 and 0.4 μm. In the band under the cladding, however, because of the silicon content, fine particles survive the brazing temperature and some of the manganese in solid solution precipitates on the existing particles. The band of dense precipitate typically has a thickness of about 20–50 μm, with a thickness of about 25–40 μm being preferred.

The as-cast core material is preferably heated to a temperature between 425° and 525° C. prior to hot rolling and held at this temperature for the minimum time required to ensure temperature uniformity. Normally the cladding is applied during the first stage of hot rolling. While it is preferred not to anneal the material, if annealing is required to obtain the desired mechanical properties, then the annealing temperature should be no higher than about 450° C. for a full anneal and no higher than about 350° C. for a partial anneal, and the anneal should be carried out after the material is rolled to final gauge.

The core alloy is typically of the type of the 3XXX series of Aluminum Association designated alloys. However, it must be within the composition ranges stated above, and it is preferred that these alloys contain no more than 0.2% iron, no more than 0.1% silicon, from about 0.2% to about 0.4% copper, from about 0.2% to about 0.4% magnesium, from about 0.9% to about 1.1% manganese and optionally from about 0.1% to about 0.15% zirconium. Thus, it was found that with regular 3003 or 3005-type of core alloys containing about 0.6% iron and about 0.3% silicon, a faint band was formed in the brazed sheet which was insufficient to provide the desired corrosion protection. On the other hand, when a purer base is used within the limits of the present invention, a definitive and effective band of dense precipitate is formed in the brazed sheet. Particularly good results are obtained when iron is kept below 0.2% and silicon is kept below 0.1%. Even better results are obtained when silicon is kept below 0.05%. Since silicon affects the manganese solid solubility the most, when it is too high in the core alloy it is not possible to obtain a strong and effective band.

The copper is added to increase the strength as well as the nobility of the core alloy. Since the cladding does not contain copper, during annealing and brazing there is copper diffusion from the band region of the core to the cladding with a net effect that the dense band is impoverished in copper relative to the rest of the core and this reduces the nobility of the band, thereby augmenting the effectiveness of the band of dense precipitate.

The manganese plays a primordial role in the band formation and a high manganese content is essential. Magnesium is added for strengthening the alloy and facilitating vacuum brazing. Titanium may be added as grain refiner, but it does not contribute to the band formation. Zirconium may be added to increase sag resistance at brazing temperatures.

When the core alloy is clad on both sides with brazing alloy, a dense band is formed on each side and corrosion protection exists for either side. For some applications, such as tube stock and header stock, only one side is clad with the brazing alloy. In that case, particularly if the core alloy has a high copper content, it is customary to clad the inside with an AA 1050-1070 pure metal layer for the purpose of improving internal corrosion.

The cladding or brazing alloy may be any aluminum alloy capable of flow under typical brazing conditions to form fillets at the contact points of the assembly sufficient to produce a sturdy bond. Such alloys will generally contain silicon as the primary alloying element, preferably at a concentration ranging from about 5% to about 15% by weight. Examples of such alloys are those of the AA 4XXX series.

In conventional processing routes, alloys of the AA 3XXX series are typically homogenized at high temperatures. This is normally done by heating to 550°–625° C. and soaking for several hours. This treatment is followed by either a second soak at a lower temperature or a slow cooling to a similar temperature. Furthermore, it is common practice to interanneal at some stage during the fabrication of the sheet. With the alloy composition of the core and the processing route of the present invention, it has been found that both homogenization and interannealing are detrimental to the corrosion resistance of the brazed product.

It has also been discovered that brazing sheet with a core having the composition of the present invention and processed according to the procedure of the present invention possesses not only superior as-brazed corrosion resistance, but also superior sag resistance when compared to materials processed in accordance with the prior art. It is believed that the superior sag resistance resulting from the present invention is in part due to the creation of large pancake-shaped grains in the core during the brazing cycle or, if annealed, during the annealing cycle. "Pancake" is defined as a grain having much larger dimensions in the plane of the sheet than in the thickness of the sheet. It is known in the art that brazing sheet with this type of grain structure has superior brazeability and sag resistance when compared to materials with finer equiaxial grains such as would result from conventional processing.

It is furthermore believed that the formation of the pancake-type grains in brazing sheet produced by the present invention is due, in part, to the state of Mn-bearing particles that precipitate during hot rolling and annealing. Thus, it has been noted that with the process of the present invention, many more and finer Mn-bearing precipitates are produced in the microstructure prior to brazing than are obtained in conventional processing. It is believed that these finer precipitates play an important role during annealing or brazing to produce the desired pancake grain structure.

It is known that the finer the precipitate, the greater the tendency for the precipitate to dissolve during brazing. This in turn causes the corrosion potential of the core to become somewhat more noble than would be the case in conventionally processed sheet.

FABRICATION PROCEDURE

The core is cast by any suitable commercial casting process, with the direct chill method being preferred. The ingot formed is then scalped and this core alloy with the desired brazing alloy liner plates is preheated in the range 425°–525° C. and hot rolled to bond the plates to the core and to reduce the thickness to an acceptable value for subsequent cold rolling. For the best compromise between the requirements of hot rolling and the requirements of this invention, a temperature in the range of 475°–500° C. is preferred, with long soak periods at temperature being avoided. The idea is to keep the manganese in the core alloy as much as possible in solid solution or in very small precipitate particles which are small enough to be unstable when later exposed to brazing temperatures of the order of 600° C.

The hot rolled stock is preferably cold rolled directly to final gauge without any interannealing. Thus, as stated above, it has been found that generally poorer corrosion results were obtained when some interanneal was provided in the cold rolling procedure. The amount of cold reduction can be as high as the alloy can stand without excessive edge cracking and cold reductions in the order of about 50 to 90% have been successful.

Before brazing, the composite sheet is usually formed into the desired part. Cold rolled sheet has poor formability and it is often necessary to anneal or partially anneal to increase the formability of the material enough to enable the parts to be formed. Here again, the same principles apply: annealing temperatures and times should be kept at a minimum to avoid the formation of coarse Mn-containing precipitate particles. Full annealing is typically carried out at about 350°–425° C., while partial annealing is typically carried out at about 250°–350° C.

During annealing, the process of silicon diffusion from the cladding into the core is initiated but the diffusion rate is very slow at temperatures of 425° C. and below. It is mostly during the brazing heat cycle, particularly in the temperature range of 550°–600° C. that rapid silicon diffusion takes place and causes most of the manganese in solid solution to precipitate and form a dense band. Additional diffusion occurs on slow cooling from brazing temperature after the brazing operation.

It is also possible to combine the anneal and the high temperature treatment (brazing step) provided sufficiently high heating and cooling rates are used to prevent precipitation growth. For instance, a rate of 30° C./min is suitable. This makes it possible to use the process to provide corrosion resistance to other products, such as tubes used in heat exchangers.

The following examples are offered for purposes of illustration only, and are intended neither to define nor limit the invention in any manner.

In the photomicrograph (magnification 100x) which illustrate a preferred embodiment of the invention:

EXAMPLE 1

Figure 1:
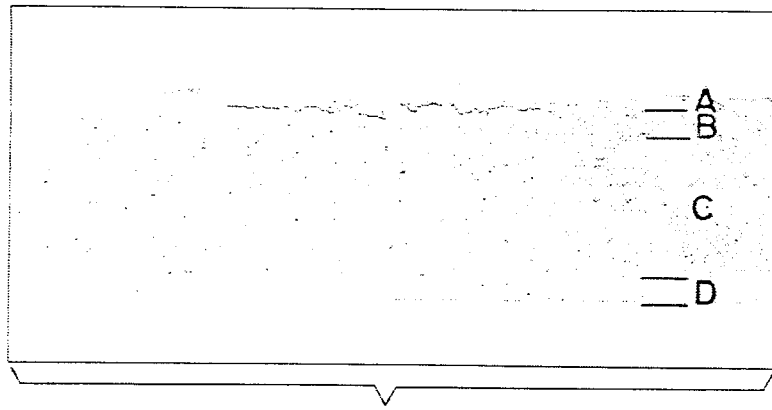
FIG. 1 is a photomicrograph of a sample as brazed.

Eleven different alloys were prepared for testing and the compositions of these alloys are shown in Table I below:

TABLE 1

| Cast No. | Chemical Compositions in Weight Percent | | | | | |
|---|---|---|---|---|---|---|
| | Cu | Fe | Mg | Mn | Si | Ti |
| IRD | 0.31 | 0.19 | 0.27 | 1.11 | 0.05 | 0.008 |
| JBN | 0.31 | 0.60 | 0.31 | 1.11 | 0.08 | 0.014 |
| JBO | 0.30 | 0.17 | 0.31 | 1.10 | 0.13 | 0.014 |
| JBP | 0.30 | 0.17 | 0.30 | 1.09 | 0.21 | 0.014 |
| JBQ | 0.30 | 0.17 | 0.28 | 1.09 | 0.33 | 0.014 |
| JBR | 0.30 | 0.31 | 0.30 | 1.09 | 0.12 | 0.013 |
| JBS | 0.30 | 0.45 | 0.28 | 1.09 | 0.21 | 0.013 |
| JBT | 0.31 | 0.20 | 0.30 | 0.58 | 0.06 | 0.013 |
| JBU | 0.15 | 0.51 | 0.51 | 0.59 | 0.20 | 0.014 |
| JBV | <0.01 | 0.19 | 0.30 | 0.99 | 0.06 | 0.013 |
| JBW | 0.30 | 0.18 | <0.01 | 0.88 | 0.06 | 0.013 |

The alloy IRD was prepared according to the present invention using industrial ingot and the other samples were prepared in the laboratory. These alloys were cast in 3¾"×9" DC sheet ingot, scalped, clad with AA 4047 with 0.2% Mg, preheated to 500° C. and hot rolled to 0.2". After cold rolling to 0.0015", sheet samples were partially annealed at 300° C. and, thereafter, submitted to a simulated brazing cycle.

The samples obtained were submitted to SWAT corrosion tests (ASTM G43) and were then examined metallographically to determine the influence of composition on the formation of a dense precipitate band in the core alloy just under the AL-Si cladding. The results obtained are shown in Table 2 below:

TABLE 2

| | Effect of Composition on Dense Band Formation | | |
|---|---|---|---|
| Alloy | Dense Precipitate Band | Band Rating* (1 best- 10 worst) | Corrosion Rating** (1 best- 5 worst) |
| IRD- .19 Fe | Thick and dense | 1 | 1 |
| JBO- .13 Si | Medium and light | 3 | 2 |
| JBP- .21 Si | Thin and faint | 5 | 4 |
| JBQ- .32 Si | Nearly non-existent | 10 | 5 |
| JBN- .60 Fe | Thick and light | 2 | 5 |
| JBR- .31 Fe .12 Si | Medium and faint | 5 | 3 |
| JBS- .45 Fe .21 Si | Thin and faint | 8 | 5 |
| JBT- .58 Mn | Thin and faint | 9 | 5 |
| JBU- .59 Mn (3005) | Thin and faint | 8 | 5 |
| JBV- No Cu | Medium and faint | 7 | 4 |
| JBW- No Mg | Medium and light | 4 | 3 |

*Rating based on band thickness (μm) and intensity.
**Corrosion rating based on results of two tests for 2, 3 and 4 weeks in SWAT.

The above results show that silicon is particularly critical to band formation, with no band being formed at 0.3% silicon. This clearly shows that a low silicon content is essential in order to obtain the results of the present invention. The iron content is also important and the results show that a low iron content is beneficial, with best results below 0.4% iron. It can be seen that lowering the manganese content is detrimental since the precipitate in the dense band is mostly made of manganese. Magnesium is not critical, but the presence of copper is important to form a strong and effective band.

EXAMPLE 2

The following experiment demonstrates how homogenization of the core alloy and interannealing affects the process of this invention.

An alloy was prepared containing 0.32% copper, 0.17% iron, 0.44% magnesium, 1.06% manganese, 0.05% silicon and 0.013% titanium. All percentages are by weight, with the balance being aluminum and incidental impurities. The alloy was either homogenized at 550° C. for 4 hours or simply preheated to 500° C. and hot rolled as described in Example 1. The alloy was clad with AA 4045 containing 0.2% magnesium and cold rolled to 0.050". Some samples obtained were interannealed and others were not, and all were cold rolled to 0.013"final gauge. After a final partial anneal, coupons cut from the samples were submitted to a vacuum brazing cycle and exposed to SWAT corrosion tests.

The results are given in Table 3 below:

TABLE 3

| Influence of Homogenization and Interannealing | | | | | | |
|---|---|---|---|---|---|---|
| Preheat °C.-h | Interanneal °C.-h | Final Anneal °C.-h | Perforation (P) in SWAT after | | | |
| | | | 1 Week | 2 Weeks | 3 Weeks | 4 Weeks |
| 550-4 | No | 300-2 | 0 | P | P | P |
| 500-1 | No | 300-2 | 0 | 0 | 0 | 0 |
| 500-1 | 350-1 | 280-2 | 0 | 0 | P | P |

The above results show that homogenization was detrimental.

EXAMPLE 3

This example demonstrates the role of the band of dense precipitate in corrosion resistance.

A core alloy was prepared containing 0.31% copper, 0.19% iron, 0.27% magnesium, 1.11% manganese, 0.05% silicon, 0.008% titanium, 0.01% zinc and the balance aluminum. This was cast and formed into a sheet by the same procedure as used in Example 1. It was clad on one side with AA 4045 and clad on the other side with AA 1070. The final sheet was 0.0125" thick and a 2"×6" sample was exposed to a vacuum braze cycle while in a vertical position. Three coupons were punched out of the sheet and the AA 1070 side was glued to Bakelite mounts. One sample remained as brazed while the other two were ground on 400 grit silicon carbide paper to expose the band of dense precipitate in one case and the main core alloy in the other case.

Figure 2:
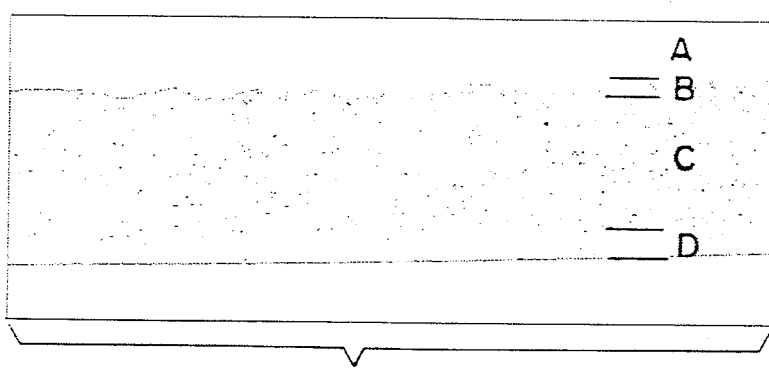
FIG. 2 is a photomicrograph of a sample with the band of dense precipitate exposed.
Figure 3:
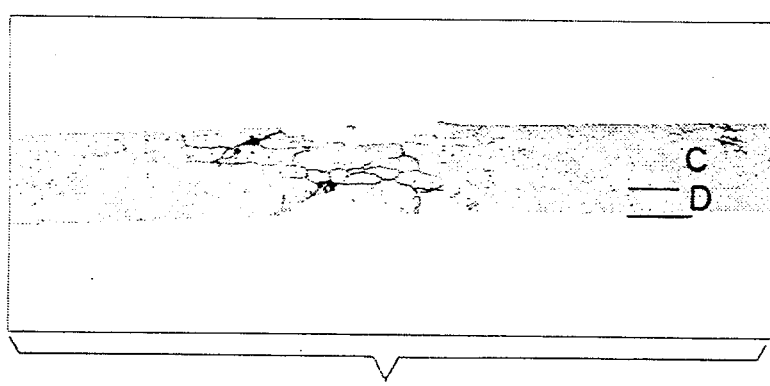
FIG. 3 is a photomicrograph of a sample with the main core alloy exposed.

The three mounts were placed in a SWAT cabinet and subjected to corrosive atmosphere for 48 hours. The three sheets were then separated from the Bakelite mounts and two sections from each were prepared for metallographic examination. The results are shown in FIGS. 1-3 in which the cladding is shown as A, the band of dense precipitate as B, the main core alloy as C and the AA 1070 layer as D. These examinations showed that the band of dense precipitate B had a beneficial effect in delaying corrosion of the core material C. It also showed that once the clad A and the band layer B had been removed or corroded away, the main portion of the bare core C perforated in less than 48 hours. This performance was similar to standard core alloys such as AA 3005.

EXAMPLE 4

The following experiment was carried out to determine the characteristics of the band of dense precipitate. A core alloy having the same composition as that of Example 3 was prepared in the same manner as described in Example 1. Samples of the alloy were examined before and after braze. One examination was a TEM examination of matrix and constituents composition, in and out of the band of dense precipitates. It was found that before brazing, the Mn-containing precipitate particles (often called dispersoids) were small and numerous with sizes in the order of 0.03 to 0.1 μm. During the brazing cycle, outside the band the smaller dispersoids dissolved and a few larger ones coarsened to a size of about 0.1 to 0.4 μm. In the band of dense precipitate, however, the small constituent particles were found to be still numerous; there was some coarsening but many small particles survived the brazing temperatures with sizes in the range of 0.03 to 0.2 μm.

Energy dispersing analysis by X-ray (EDAX) of matrix and particles, before and after brazing, revealed significant variations. The average results are given in Table 4 below.

TABLE 4

| | Average Analysis of Core Matrix and Constituents | | | | | | | |
|---|---|---|---|---|---|---|---|---|
| | Matrix | | | | Precipitate Particles | | | |
| Condition | No. of Readings | Al % | Mn % | Si % | No. of Readings | Al % | Mn % | Si % |
| Core before braze | 3 | 99.5 | 0.5 | — | 3 | 88.8 | 10.1 | 1.0 |
| Core out of band After braze | 2 | 99.3 | 0.6 | 0.02 | 2 | 82.3 | 17.6 | 0.1 |
| In band After braze | 2 | 98.7 | 0.1 | 1.2 | 4 | 78.8 | 14.4 | 6.8 |

The above table shows that the manganese content in the matrix, well inside the core, was increased slightly by the brazing operation but reduced markedly in the band of dense precipitate. At the same time, the silicon content which was very low away from the band was at the 1.2% level in the band. This silicon in the band diffused in from the Al-Si cladding layer.

The precipitate particles before brazing contained Al, Mn and Si, but after brazing, the particles away from the band were coarsened by further manganese precipitation and contained mostly Al and Mn. In the band, after brazing, the particles had a higher average silicon content than in the original particles.

It appears that during the brazing cycle, there is formation of a Si-rich layer, just under the Al-Si cladding, and the high silicon content reduces drastically the solid solubility of manganese in the core alloy. Well inside the core, the silicon is low and manganese remains fairly soluble, so that the fine, unstable dispersoids dissolve and some manganese precipitates on the coarser surviving particles. Thus, the manganese in the core prior to brazing is substantially in solid solution and/or in the form of said fine particles, with at least 0.6% manganese preferably being in the above form. In the brazed product, there is substantially less manganese in solid solution in the ban than in the core outside the band, with the core outside the band preferably containing at least 0.3% manganese in solid solution.

It should be understood that the above description is merely illustrative of this invention and that many changes and modifications may be made by those skilled in the art without departing from the scope of the appended claims.

We claim:

1. A process for producing a corrosion resistant aluminum composite sheet product for use in brazing, which comprises:
    (a) casting an aluminum-base ore material containing no more than 0.4% iron, no more than 0.15% silicon, from about 0.1% to about 0.6% copper and from about 0.7% to about 1.5% manganese,
    (b) cladding the as-cast core material with an aluminum-base brazing alloy containing silicon as the primary alloying element, with hot rolling to form a sheet product, and
    (c) directly cold rolling said sheet product to final gauge, said cold rolled product being formed without substantial homogenization or interannealing and being capable of forming a corrosion resistant band of dense precipitate in the core alloy immediately adjacent the cladding upon being subjected to a brazing heat cycle.

2. A process according to claim 1, wherein the core alloy contains up to 0.8% magnesium.

3. A process according to claim 1, wherein the core alloy contains about 0.05% to about 0.25% zirconium.

4. A process according to claim 1, wherein the core alloy comprises no more than 0.2% iron, no more than 0.1% silicon, from about 0.2% to about 0.4% copper, from about 0.2% to about 0.4% magnesium and from about 0.9% to about 1.1% manganese.

5. A process according to claim 4, wherein the core alloy also contains about 0.1% to about 0.15% zirconium.

6. A process according to claim 1, wherein the core material is heated to a temperature between 425° and 525° C. prior to hot rolling.

7. A process according to claim 1, wherein the core material is heated to a temperature between 475° and 500° C. prior to hot rolling.

8. A process according to claim 1, wherein the product rolled to final gauge is then annealed.

9. A process according to claim 8, wherein the product rolled to final gauge is either partially annealed at about 250°–350°C. or is fully annealed at about 350°–425°C.

10. A process according to claim 1, wherein the product obtained is subjected to a brazing heat cycle whereby a band of dense precipitate is formed in the core alloy immediately adjacent the cladding.

11. An aluminum alloy composite sheet material suitable for forming into parts to be assembled and brazed comprising (a) a cast aluminum-base core containing no more than 0.4% iron, no more than 0.15% silicon, from about 0.1% to about 0.6% copper and from about 0.7% to about 1.5% manganese and (b) an aluminum-base brazing alloy containing silicon as the primary alloying element clad on at least one side of said core, wherein the manganese in the core is substantially in solid solution and/or in the form of a fine, uniformly distributed precipitate of manganese-containing particles having sizes in the range of 0.03 to 0.1 µm.

12. An aluminum alloy composite sheet according to claim 11, wherein the core contains at least 0.6% manganese in solid solution and/or in the form of said fine precipitate.

13. A brazed aluminum composite produced from a brazable composite comprising (a) a cast aluminum-base core containing no more than 0.4% iron, no more than 0.15% silicon, from about 0.1% to about 0.6% copper and from about 0.7% to about 1.5% manganese and (b) an aluminum-base brazing alloy containing silicon as the primary alloying element clad on at least one side of said core.

wherein a silicon-rich band of dense precipitate formed in the core alloy immediately adjacent the brazing alloy cladding, said band having a thickness of about 20–15 µm and characterized by substantially less manganese in solid solution in the band than in the core outside the band.

14. A brazed aluminum composite according to claim 13, wherein the core outside the band contains at least 0.3% manganese in solid solution.

* * * * *

UNITED STATES PATENT AND TRADEMARK OFFICE
CERTIFICATE OF CORRECTION

PATENT NO. : 5,041,343

DATED : August 20, 1991

INVENTOR(S) : Paul E. Fortin, Pierre Henri Marois and Dewi G.S. Evans

It is certified that error appears in the above-indentified patent and that said Letters Patent is hereby corrected as shown below:

Column 10, line 25, change "20-15" to -- 20-50 --.

Signed and Sealed this

Twenty-sixth Day of October, 1993

Attest:

BRUCE LEHMAN

Attesting Officer

Commissioner of Patents and Trademarks